(12) United States Patent
Boivie

(10) Patent No.: US 6,502,140 B1
(45) Date of Patent: Dec. 31, 2002

(54) MULTICAST SUPPORT FOR SMALL GROUPS

(75) Inventor: Richard H. Boivie, Monroe, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/240,549

(22) Filed: Jan. 29, 1999

(51) Int. Cl.⁷ .............................................. G06F 15/173
(52) U.S. Cl. ...................................... 709/238; 709/203
(58) Field of Search ................................ 370/352, 408, 370/60, 236, 390, 401; 709/218, 219, 227, 238, 245

(56) References Cited

U.S. PATENT DOCUMENTS

| | | | | |
|---|---|---|---|---|
| 5,331,637 A | * | 7/1994 | Francis et al. ............... | 370/408 |
| 6,018,766 A | * | 1/2000 | Samuel et al. ............... | 709/218 |
| 6,052,718 A | * | 4/2000 | Gifford ........................ | 709/219 |
| 6,101,180 A | * | 8/2000 | Donahue et al. ............. | 370/352 |
| 6,119,163 A | * | 9/2000 | Monteiro et al. ............ | 709/227 |
| 6,154,463 A | * | 11/2000 | Aggarwal et al. ........... | 370/408 |
| 6,212,563 B1 | * | 4/2001 | Beser ........................... | 709/227 |
| 6,226,686 B1 | * | 5/2001 | Rothschild et al. .......... | 709/245 |
| 6,269,080 B1 | * | 7/2001 | Kumar ......................... | 370/236 |
| 6,321,270 B1 | * | 11/2001 | Crawley ...................... | 709/238 |

OTHER PUBLICATIONS

"Multicast Source Routing Routing in Packet-Switched Networks" Yum et al. Communications, IEEE Transactions on pages 1212-1215 Feb.-Apr. 1994.*

"Multicast Communications in "ad hoc" networks" Vechiclur Technology Conference, 1998. VTC 98. 48th IEEE.*

* cited by examiner

Primary Examiner—N. Le
Assistant Examiner—Walter Benson
(74) Attorney, Agent, or Firm—Fleit, Kain, Gibbons, Gutman & Bongini P.L.; Michael J. Buchenhorner; Casey P. August

(57) ABSTRACT

A method for multicasting data packets includes the steps of preparing at least one packet at a source node and transmitting the packet to at least one intermediate node. The packet includes a payload portion and multicast route information. The multicast route information includes information for use by the intermediate node to forward the packet to at least two destination nodes. According to another aspect of the invention, a method for multicasting data packets in a packet-based data network includes the step of transmitting an Internet Protocol ("IP") packet from a source node to a first node. The IP packet includes an IP header and an IP payload containing an encapsulated multicast (EM) datagram, the EM datagram comprising an EM header and an EM payload. The EM header includes multicast routing information instructing the first node to transmit the EM payload to at least two second and third nodes. According to another embodiment, a system including various network nodes is adapted to implement the described method.

44 Claims, 2 Drawing Sheets

MULTICAST SUPPORT FOR SMALL GROUPS

CROSS-REFERENCE TO RELATED APPLICATIONS

Not applicable.

BACKGROUND OF THE INVENTION

1. Field of the Invention

The invention disclosed broadly relates to the field of computer networks, and more particularly relates to the field of multicasting under various protocols including the Internet protocol (IP).

2. Description of the Related Art

The Internet has provided the public worldwide network required for the global linking of various networks and application of personal computers. In this regard, the Internet Protocol ("IP") has become an important moving force for the growth of computer applicability. The Internet is a packet-based communication system. Each packet comprises a header portion that includes routing information and a payload (or message) portion that includes the data to be delivered. The header portion includes a destination node, a source node, and a portion identifying the protocol as the IP. IP packets can be transmitted as unicasts or multicasts. A unicast is a point-to-point transmission wherein the header identifies one source and one destination. A multicast identifies various destinations. In the case of a multicast, the destination address in the IP header corresponds to a group of several destination nodes. Thus, a multicast would be initiated by a source node sending an IP packet to a "group" address such that it reaches all the nodes in the group. There are various multicast algorithms in common use today. Thus, the IP protocol has many applications such as electronic-mail and IP telephony. Of these applications, IP multicast will be increasingly important in the future, and it will become more useful to support large numbers of "small" multicast groups. This will be driven by several developments—such as IP Telephony and the emergence of small, mobile computing devices that are capable of supporting real-time voice and data communications. As IP telephony becomes widely adopted, it will become very important to support large numbers of conference calls with a small number of parties (such as 5 or less). It seems reasonable to expect that there will be a similar need to support many similarly small voice-data conferences and voice-data-video conferences. Multicasting offers one solution to the problem of providing efficient communications within groups.

Some of today's IP multicast schemes, such as the "dense mode" schemes, are suitable for the case in which there are a small number of large multicast groups that are of interest all over the Internet. These work well if one is trying to distribute "broadcast channels" like ABC, NBC, CBS, BBC, CNN and ESPN to viewers all around the world but they have scalability problems when there is a large number of groups. The nodes in the IP network build a distribution tree for each source and multicast group pair and they disseminate this multicast routing information to places where it is not needed—which is not desirable due to increased congestion.

In other schemes such as CBT (Core Based Trees) there has been an attempt to limit the amount of multicast routing information that needs to be disseminated, processed, and stored throughout the network. These schemes use a "shared distribution tree" that is shared by all the members of a multicast group and they try to limit the distribution of multicast routing information so that this information only goes to the nodes that "really need it." But these schemes also have problems. These problems include: (1) the tendency to concentrate traffic on small portions of a network and use of less than optimal paths in routing packets to their destinations, and (2) the requirement that each of the routers on a multicast tree "signal" and store the multicast routing information, which can be a problem if there are a large number of multicast groups.

Accordingly, there is a need for a system which overcomes the above problems.

SUMMARY OF THE INVENTION

The multicasting system described herein provides a solution for the problems discussed above for the case of small groups. The system can handle a very large number of small groups because the nodes in the network do not need to disseminate or store any multicast routing information for these groups. The scheme has the added benefit that packets always take the "right" path; that is, the path determined by the ordinary unicast route protocols.

The system in accordance with the invention takes advantage of one of the fundamental tenets of Internet "philosophy", namely that one should concentrate complexity at the edges of the network and keep the middle of the network simple. This is the principle that guided the design of IP and Transmission Connect Protocol ("TCP") and this is the principle behind the efforts of the recently formed Differentiated Services Working Group in the Internet Engineering Task Force ("IETF").

Therefore, in accordance with the invention, in a multicast system, the source of a multicast transmission sends multicast packets, each comprising a payload and multicast route information, for use by intermediate nodes to route each packet to the desired destinations replicating the packet as necessary.

DETAILED DESCRIPTION OF AN EMBODIMENT

Figure 1:
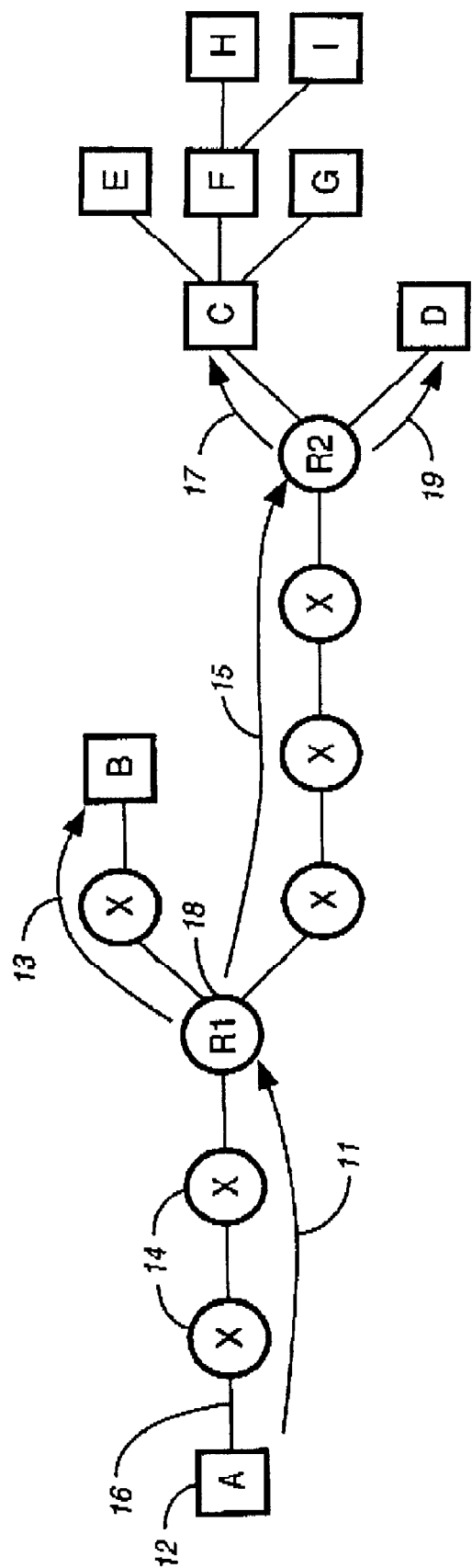
FIG. 1 is an illustration of a portion of an IP network according to the present invention.

Referring to FIG. 1 there is shown a portion of a data network 10 representing an embodiment of the invention. The network 10 includes a plurality of nodes each comprising end-stations which can be large host computers or user stations like personal computers or telephone handsets, and intermediate nodes which can be routers or switches. The system 10 further comprises a series of routers 18 located at points in the network where there is a fork in the multicast transmission tree (represented by nodes R1 and R2). The nodes in the network 10 are coupled by means of a plurality (two or more) links 16.

The network 10 can be operated under the IP but the principles of the invention also apply to other protocols such as Appletalk, Novell IPX or successors to any of those protocols. When the user of the source node A wishes to send a multicast packet, the data processing system at source node A prepares a packet (or set of packets) that includes information that intermediate nodes can use to deliver the packet to the desired destinations. In the example shown, source node A can send a multicast transmission to destination nodes B, C and D by sending a transmission (including a packet or set of packets) 11 to an intermediate node R1 that includes appropriate instructions so that: (1) node R1 can forward an appropriate packet 13 to node B; and (2) node R1 can forward an appropriate packet 15 to R2 that node R2, in turn, can use to forward appropriate packets 17 & 19 on to nodes C and D respectively.

The packet 11 that node A sends to node R1 may look like this:

IP header: dest=R1, src=A, protocol=encapsulated multicast (i.e. a new protocol type)

IP payload: contains an encapsulated multicast datagram

Where the encapsulated multicast (EM) datagram might look like this:

EM header:

one byte indicating the header length and a variable number of bytes of "multicast routing information". The EM header can be defined in a number of ways. One possibility can include a version number, a header length, a header checksum and then the actual multicast routing information. EM payload: the payload that A is trying to get delivered to B, C, and D The multicast routing information may look like:

B R2 (C D)

This multicast routing example means that node R1 should send one packet to node B and one packet to R2 and that the packet to node R2 should include instructions that node R2 can use to get the packet to nodes C and D.

The multicast routing information recursively nests to an arbitrary depth so if node C were a router that was supposed to forward packets to nodes E, F, and G, the multicast routing information would look like this:

B R2 (C (E F G) D)

If node F were a router that was supposed to forward packets to nodes H & I, the multicast routing information would look like this:

B R2 (C ( E F ( H I ) G) D)

A node can be both an intermediate and destination node. In the case of a node that is only a destination, the packet transmitted does not include instructions for a subsequent node to transmit to another node.

In one embodiment, the nodes in the list are 4-byte IPv4 unicast addresses, thus the left and right parentheses can be encoded in a single byte using values that are not used as the first byte of an IPv4 unicast address. In other words, a left parenthesis might be a byte with a decimal value of 224, for example, and a right parenthesis might have a value of 225. Also there are various ways to indicate the length of the field comprising the multicast routing information. One way is to include a length field in the packet. Another way is to use a marker to indicate the end of the multicast routing information. If an 'end of routing information' byte were used, this byte could have a value of 226, for example.

Since the packet contains all the necessary routing information it is easy for the nodes in the network to perform the appropriate forwarding or routing.

When node R1 receives a packet with routing information equal to:

B R2 (C (E F (H I) G) D)

It forwards one copy of the multicast payload to node B and one copy to node R2. The copy sent to node R2 contains routing information equal to:

C (E F (H I) G) D

When node R2 receives this packet, it forwards one copy of the packet to C with routing information equal to:

E F (H I) G and one copy of the packet to D. Similarly, when node C receives the packet, it sends a copy to nodes E, F, and G and when node F receives a copy of the packet, it forwards a copy to nodes H and I.

A node can eliminate items in the multicast routing information when forwarding packets as suggested in the example above. Another alternative is to use a pointer that indicates at what point the routing is. The pointer could indicate to a node along the route that a certain byte (byte 11 for example) has been processed, providing an indication of the status of the routing. A third alternative is that the node can simply "find itself" in the multicast routing information and process the packet according to the instructions found at that point in said multicast routing information.

Of course, the data processing system at source node A, must figure out the multicast routing information for the multicast flow. This is straightforward. At the beginning of a multicast transmission, node A, determines the route to each of the destinations. It can do this with something like the IP record-route option (which is slightly broken in IPv4 since the number of hops that can be recorded in the IP header is small) or something like an IP traceroute. It would be better to determine the route for the multicast flow with a single packet per destination so it would be advantageous to fix the IP record-route option or add a similar capability that actually works.

Once node A has a route to each of the various destinations, it can "fold" those routes together into an appropriate multicast tree. This "folding" can be accomplished in two steps.

In step 1, the routes to the various destinations are sorted "alphabetically" so that routes that share a common prefix are grouped together. For example, if node A had the following routes to destinations B, C and D:

R1 R2 D

R1 B

R1 R2 C it would sort those routes to produce the following sorted listed.

R1 B

R1 R2 C

R1 R2 D.

(In an IPv4 network, the nodes in the routes would be 4-byte integers rather than letters, but the basic concept remains the same.)

In step 2, node A "factors" out the common parts of adjacent list elements to produce a single route corresponding to a multicast distribution. In the above example, the last two routes can be combined to produce the following list:

R1 B

R1 R2 (C D)

and then the remaining two routes can be combined to produce a list with a single element.

R1 (B R2 (C D))

Once node A has built the multicast distribution tree, it can begin sending multicast packets. When routes change, the source node A must adjust its multicast tree. This can be accomplished as follows.

Node A can send a unicast record-route packet periodically to each destination and adjust its multicast tree and its multicast routing information as appropriate.

The nodes (i.e., routers) in the middle of the network can also send an Internet Control Message Protocol ("ICMP")

message if/when they detect that node A needs a new multicast tree. If a router, R, on the tree does not have a route to one of the places that it is supposed to send packets to, node R should inform node A of that via an ICMP error message. When node A gets this message, it can send out the record-route unicast packets and rebuild its tree.

A router, R, that is forwarding a multicast packet to one or more next hops can also send node A an appropriate ICMP message if the tree seems to be incorrect at R. The link on which router R receives a given packet and the links on which router R forwards that packet should all be distinct. If this is not the case, router R can conclude that routes have changed and that the current multicast tree is no longer appropriate. So router R should send an ICMP message to node A so that node A can rebuild the tree.

Also, in many cases a higher level entity in the protocol stack, such as the Real-Time Transport Protocol ("RTP")/ RTP Control Protocol (RTCP) will monitor the quality of the "connection." In this case, the higher level entity in node A can inform the lower levels when connection quality deteriorates so that the lower levels in node A can rebuild the multicast tree. This is something like what Berkeley Unix based Transmission Control Protocol ("TCP") implementations do. When TCP detects a problem with a connection, it tells the IP so that IP can throw away any route for the connection that it may have cached.

If the routers and the higher level entities in node A inform node A's multicasting layer of problems as described above, the periodic transmission of the unicast packets does not need to be very frequent. If node A sends a unicast packet to each of five destinations every two seconds that is a relatively small amount of overhead on a voice conference call in which node A may be sending on the order of 60 multicast voice sample packets per second. Of course if data and/or video is added to the voice conference, the amount of overhead as a percentage of the total packets transmitted decreases. Another possibility is to eliminate periodic re-transmission entirely because the other mechanisms may be sufficient to re-create the tree.

One other advantage of this scheme is that it can work in the presence of "legacy" routers; that is, routers that are not programmed for the encapsulated multicast scheme. Even if some router between nodes A and R1 in FIG. 1 is not programmed for encapsulated multicast, the scheme works well. If node R1 is not programmed to handle an encapsulated multicast packet, the routing can still work to a certain extent. Node R1 will send an ICMP error back to node A and node A will know that it cannot count on R1 to perform the replicate-and-forward so node A can send 2 packets, 1 to node B and 1 packet to node R2. Node A can also handle the case if node R2 or another downstream fork in the tree cannot handle encapsulated multicast. The system will not work quite as well if many routers cannot handle encapsulated multicast but things will work. This backward compatibility with legacy routers is important since one cannot expect to upgrade all the routers in a large network such as the Internet or a large enterprise network instantaneously.

One disadvantage of this scheme is that the multicast packets need to include the multicast routing information, but this may not be a serious problem. Voice sample packets are typically fairly short, on the order of 20 bytes of data, so there is plenty of room in an Ethernet packet to include the multicast routing information and the rest of the Encapsulated Multicast ("EM") header, for example. If longer packets need to be distributed this could be an issue, though the EM header is fairly small for small multicast groups.

In summary, the system has the following advantages as will be apparent to those skilled in the art:

(1) The Present Invention can handle a large number of small groups.

(2) The effort involved to support these multicast groups is distributed to the nodes that actually need to know about these groups. If a node does not need to know about a multicast group, it does not have to do any work.

(3) The routers do not have to run a multicast routing protocol for these multicast groups. They do not have to send, receive, or process any multicast routing protocol messages and the routers do not have to store any per flow state for each of the potentially large number of multicast flows that may be present in the network.

(4) Traffic follows the correct paths as determined by the unicast routing protocols and the traffic is not concentrated in a small portion of the network. Network efficiency and latency is optimized.

(5) There is no need to talk to a single, centralized entity to acquire a unique multicast address when you set up a multipoint conference, which is important since such an entity can be a bottleneck and a point of failure.

(6) A majority of the forwarding that takes place in one of these multicast trees is conventional unicast forwarding, a highly optimized path in modern routers which runs very fast. The slower multicast forwarding only occurs at the "forks" in the tree, which also increases the performance and scalability of this scheme.

Figure 2:
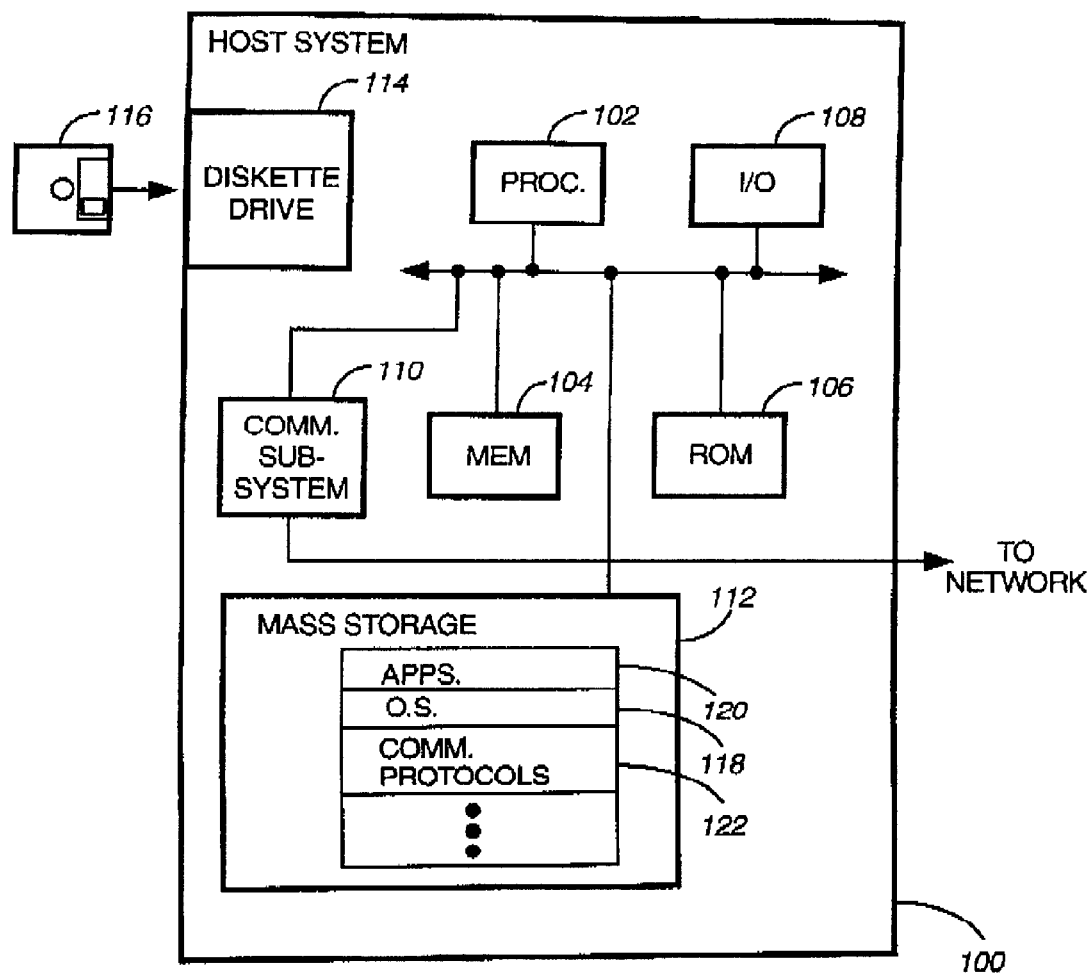
FIG. 2 is an illustration of a host IP processing unit for use according to the present invention.

Referring to FIG. 2, there is shown a simplified block diagram of a host system 100. The host system 100 could be used in any of the nodes shown in FIG. 1. The host system 100 comprises a processor 102, a memory 104, a ROM (read-only memory) 106, an I/O subsystem 108, a communication subsystem 110, and mass storage 112. The I/O subsystem 108 may comprise a keyboard, display screen, pointing device or other interfaces with a user be they direct or indirect. The communication subsystem 110 can be implemented in a variety of ways including a modem or a communications card according to any of several known protocols such as Ethernet or Token Ring. The connections shown herein are vastly simplified for illustration purposes. The mass storage subsystem may be implemented as a hard disk drive and associated controller. The system 100 is equipped with a diskette drive 114 adapted to receive diskettes 116 but could also include a CD ROM drive or any other suitable drive for removable information storage media. As is typical with systems such as this, the mass storage includes an operating system 120, a plurality of applications programs 118 and communication protocols 122. Thus in accordance with one embodiment of the invention, the general purpose computing apparatus can be programmed via a set of diskettes, CD ROM or over a network to operate in accordance with the protocol set forth herein. Alternatively, special purpose apparatus can be designed to implement the functionality of the invention. Any of the nodes shown in FIG. 1 can be programmed or otherwise adapted to operate in accordance with the invention.

Each node unit 100 can receive data packets under various protocols via the communication subsystem 110. The system 100 can also be used to package payloads (data) to create packets under a programmed protocol and to transmit such packets via subsystem 110 under the control of processor 102.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for multicasting data packets in a packet-based data network comprising the source node steps of:

preparing at a source node where a multicast communications originates at least one packet comprising a payload portion and multicast route information so that the multicast route information causes the packet to be muted only once over any given route which is part of a multicast tree when the packet is simultaneously sent to more than one destination node; and transmitting the packet from the source node to two or more destination nodes with at least one intermediate node;

wherein the multicast route information includes destination routing information for use by the at least one intermediate node to forward the packet to at least two destination nodes, without the need to transmit the packet to a centralized entity and without the need to store multicast routing information at the at least one intermediate node, wherein the multicast route information comprises a plurality of route definitions, wherein at least two route definitions within the plurality of route definitions share a common node and wherein the at least two route definitions have been folded so that nodes beyond the common node that are beyond the common node and within the at least two route definitions are grouped and identified as routing information for the packet beyond the common node, and wherein the common node is only specified once.

2. The method of claim 1 wherein the multicast route information nests to a variable depth within the packet.

3. The method of claim 1 wherein the intermediate node transmits the packet responsive to receiving the packet, and further comprising the step of replicating the at least one packet before transmitting the packet.

4. The method of claim 1 wherein at least one node in the data network performs multicast routing by performing the steps of:

reading the packet received;

locating an address identifying the at least one node in the multicast routing information; and replicating and forwarding the packet based on the instructions for the at least one node.

5. The method of claim 1 wherein the step of preparing at least one packet comprises determining the multicast routing information for the multicast flow.

6. The method of claim 5 wherein the step of preparing at least one packet comprises determining a route for each of the desired destinations.

7. The method of claim 5, wherein the step of preparing at least one packet comprises sending a unicast record-route packet, under the Internet Protocol (IP), to each desired destination and building a multicast distribution tree and multicast routing information.

8. The method of claim 5 wherein the step of preparing at least one packet step comprises using a traceroute program under the (IP).

9. The method of claim 1 further comprising the intermediate node step of:

receiving the packet transmitted by the source node and sending an Internet Control Message Protocol (ICMP) message when a new multicast tree is required.

10. The method of claim 1 further comprising the intermediate node steps of:

receiving the packet transmitted by the source node;

detecting that the source code requires new multicasting information; and transmitting a message to the source node indicating that new multicasting information is required.

11. The method of claim 10 wherein the step of transmitting a message comprises transmitting an ICMP error message to the source node.

12. The method of claim 10 wherein the detecting step comprises the step of:

transmitting an ICMP message indicating that the routing information is incorrect at the intermediate node.

13. The method of claim 12 wherein the detecting step includes the step of:

transmitting an ICMP message indicating that the intermediate node does not have a route to at least one of the next hops specified in the received packet.

14. The method of claim 12 wherein the detecting step includes the step of:

transmitting an ICMP message indicating that the intermediate node must use for transmission the same link as the one it received the packet from, responsive to the received packet.

15. The method of claim 12 wherein the detecting step includes the step of:

transmitting an ICMP message indicating that the intermediate node must send multiple packets on the same link, responsive to the received packet.

16. The method of claim 10 wherein the source node uses a higher level protocol to inform the multicast function when connection quality deteriorates.

17. The method of claim 10 wherein the detecting step includes the step of:

receiving at the source node an ICMP error message from the intermediate node and modifying the routing tree responsive thereto.

18. The method of claim 1 wherein at least one intermediate node receives the packet transmitted by the source node, the intermediate node is not programmed to process the received multicast packet, and the method comprises the step of:

transmitting an ICMP error message from the intermediate node to the source node.

19. The method according to claim 1, wherein the multicast route information does not include identification of nodes that forward fewer than two copies of the packet.

20. A method for multicasting data packets in a packet-based data network comprising the steps of:

preparing at a source node where a multicast communications originates at least one packet under a first protocol comprising a payload portion and multicast route information so that the multicast route information causes the packet to be routed only once over any given route which is part of a multicast tree when the packet is simultaneously sent to more than one destination node; and transmitting the packet from a source node to a first node, the packet comprising a header and a payload containing an encapsulated multicast ("EM") datagram, the EM datagram comprising an CM header and an EM payload; the EM header comprising multicast routing information instructing the first node to transmit the EM payload to at least second and third nodes;

wherein the method does not require the source node to transmit the packet to a centralized entity and the method does not require multicast routing information be stored at intermediate nodes, and wherein the multicast route information comprises a plurality of route definitions, wherein at least two route definitions within the plurality of route definitions share a common node and wherein the at least two route definitions have been folded so that nodes beyond the common node that are beyond the common node and within the at least two route definitions are grouped and identified as routing information for the packet beyond the common node, and wherein the common node is only specified once.

21. The method of claim 20 wherein the multicast routing information is recursively nested at a variable depth within the packet.

22. The method of claim 20 wherein the routing information further comprises instructions for instructing the second node to transmit the EM payload to a fourth node.

23. The method of claim 20 wherein the first protocol is the IP.

24. The method of claim 20 wherein the first protocol header comprises a destination address identifying the first node and a protocol field identifying the EM protocol to be used.

25. The method of claim 20 wherein the EM header comprises at least one byte indicating the header length and a plurality of bytes that include multicast routing information.

26. The method of claim 20 wherein the EM header comprises a version number identifying the version of the specified protocol being used.

27. The method of claim 20 wherein the EM header comprises a header checksum.

28. The method of claim 20 wherein the packet comprises a marker indicating the end of the multicast routing information.

29. A computer readable medium comprising instructions for:

transmitting an IP packet from a source node where a multicast communications originates to a first node, the IP packet comprising an IP header and an IP payload containing an encapsulated multicast (EM) datagram, the EM datagram comprising an EM header and an EM payload; the EM header comprising multicast routing information instructing the first node to transmit the EM payload to at least two second and third nodes, without the need to transmit the packet to a centralized entity and without the need to store multicast routing information at tho first nodo;

wherein the multicast routing information causes the packet to be routed only once over any given route which is part of a multicast tree when the packet is simultaneously sent to at least two second and third nodes, and wherein the multicast routing information comprises a plurality of route definitions, wherein at least two route definitions within the plurality of route definitions share a common node and wherein the at least two route definitions have been folded so that nodes beyond the common node that are beyond the common node and within the at least two route definitions are grouped and identified as routing information for the packet beyond the common node, and wherein the common node is only specified once.

30. The medium of claim 29 wherein the multicast routing information is recursively nested at a variable depth within the IP packet.

31. The medium of claim 29 wherein the EM header further comprises routing information instructing the second node to transmit the EM payload to at least a fourth node.

32. The medium of claim 29 wherein the EM header further comprises routing information instructing the third node to transmit the EM payload to at least a fourth node.

33. The medium of claim 29 wherein the IP header comprises a destination address identifying the first node and a protocol field identifying the EM protocol to be used.

34. The medium of claim 29 wherein the EM header comprises at least one byte indicating the header length and a plurality of bytes that include multicast routing information.

35. The medium of claim 29 wherein the EM header further comprises a version number identifying the version of the specified protocol being used.

36. The medium of claim 29 wherein the EM header further comprises a header checksum.

37. The medium of claim 29 wherein the EM header further comprises a marker indicating the end of the multicast routing information.

38. A method for multicasting data packets in a packet-based data network comprising the steps of:

receiving at least one data packet, wherein the at least one data packet includes multicast routing information for forwarding specified packets to at least two other nodes, without the need to transmit the packet to a centralized entity and without the need to store multicast routing information at intermediate nodes;

processing the multicast routing information included in the at least one data packet to determine downstream routing; and preparing at least two data packets for transmission to at least two nodes, and sending those data packets;

wherein the multicast routing information causes the packet to be routed only once over any given route which is part of a multicast tree when the packet is simultaneously sent to more than one destination node, and wherein the multicast route information comprises a plurality of route definitions, wherein at least two route definitions within the plurality of route definitions share a common node and wherein the at least two route definitions have been folded so that nodes beyond the common node that are beyond the common node and within the at least two route definitions are grouped and identified as routing information for the packet beyond the common node, and wherein the common node is only specified once.

39. A method for preparing at least one multicast packet, for use in a packet-based data network, comprising the step of:

creating at a source node where a multicast communications originates a header designating at least two destination nodes; creating a payload portion comprising data to be delivered to the at least two destination nodes; and including, in the packet, multicast routing information for use by at least one intermediate node to mute the multicast packets to at least two destination nodes, without the need to transmit the packet to a centralized entity and without the need to store multicast routing information at the at least one intermediate node; wherein the multicast routing information causes the packet to be routed only once over any given route which is part of a multicast tree when the packet is simultaneously sent to more than one destination node, and wherein the multicast route information comprises a plurality of route definitions, wherein at least two route definitions within the plurality of route definitions share a common node and wherein the at least two route definitions have been folded so that nodes beyond the common node that are beyond the common node and within the at least two route definitions are grouped and identified as routing information for the packet beyond the common node, and wherein the common node is only specified once.

40. The method of claim 39 wherein the step of including multicast routing information in the packet further comprises including the multicast routing information in the payload portion.

41. The method of claim 39 wherein the multicast routing information is recursively nested to an variable depth within the at least one packet and available to each of the intermediate nodes that is to route the payload to a destination node.

42. A multicast packet comprising:

a data payload; a header identifying a source node where a multicast communications originates, at least an intermediate node, and a protocol type; the payload including routing information for use by the intermediate node to route the multicast packet to at least two other nodes, without the need to transmit the packet to a centralized entity and without the need to store multicast routing information at the intermediate node;

wherein the multicast routing information causes the packet to be routed only once over any given route which is part of a multicast tree when the packet is simultaneously sent to more than one destination node, and wherein the multicast route information comprises a plurality of route definitions, wherein at least two route definitions within the plurality of route definitions share a common node and wherein the at least two route definitions have been folded so that nodes beyond the common node that are beyond the common node and within the at least two route definitions are grouped and identified as routing information for the packet beyond the common node, and wherein the common node is only specified once.

43. A data network system comprising a plurality of nodes, wherein at least some of the plurality of nodes comprise:

means for preparing at a source node where a multicast communications originates at least one packet comprising a payload portion and a multicast route information so that the multicast route information causes the packet to be routed only once over any given route which is part of a multicast tree when the packet is simultaneously sent to more than one destination node and wherein the multicast route information comprises a plurality of route definitions, wherein at least two route definitions within the plurality of route definitions share a common node and wherein the at least two route definitions have been folded so that nodes beyond the common node that are beyond the common node and within the at least two route definitions are grouped and identified as routing information for the packet beyond the common node, and wherein the common node is only specified once; and means for transmitting multicast packets from the source node to two or more destination nodes including a payload and multicast route information for use by intermediate nodes to route the packets to designated destinations, without the need to transmit the packets to a centralized entity and without the need to store multicast routing information at the intermediate nodes; and means for receiving data.

44. The data network system according to claim 43, wherein the multicast route information does not include identification of nodes that forward fewer than two copies of the packet.

* * * * *

UNITED STATES PATENT AND TRADEMARK OFFICE
CERTIFICATE OF CORRECTION

PATENT NO.     : 6,502,140 B1
DATED          : December 31, 2002
INVENTOR(S)    : Boivie It is certified that error appears in the above-identified patent and that said Letters Patent is hereby corrected as shown below:

Column 7,
Line 12, from "muted" to -- routed --

Column 8,
Line 62, from "CM" to -- EM --

Column 9,
Line 51, from "tho first nodo" to -- the first node --

Column 10,
Line 59, from "mute" to -- route --

Signed and Sealed this

Fourth Day of March, 2003

JAMES E. ROGAN
*Director of the United States Patent and Trademark Office*